(12) United States Patent
Neal

(10) Patent No.: US 6,814,876 B1
(45) Date of Patent: Nov. 9, 2004

(54) VERSATILE, MODULAR, MULTI-STAGE WATER PURIFICATION SYSTEM

(75) Inventor: Thomas F. Neal, Boulder City, NV (US)

(73) Assignee: Vortech Latinoamerica, Heredia (CR)

( * ) Notice: Subject to any disclaimer, the term of this patent is extended or adjusted under 35 U.S.C. 154(b) by 162 days.

(21) Appl. No.: 10/091,834

(22) Filed: Mar. 5, 2002

Related U.S. Application Data

(60) Provisional application No. 60/348,087, filed on Jan. 11, 2002, and provisional application No. 60/273,646, filed on Mar. 6, 2001.

(51) Int. Cl.[7] .............................. C02F 1/32; C02F 1/78
(52) U.S. Cl. ...................... 210/748; 210/760; 210/192; 210/202; 210/205; 210/260; 422/24
(58) Field of Search ................................. 210/748, 764, 210/758, 760, 205, 198.1, 202, 232, 259, 260, 314, 416.3, 446, 449, 192; 422/24, 186.07, 186.3; 250/436

(56) References Cited

U.S. PATENT DOCUMENTS

| | | | |
|---|---|---|---|
| 2,079,475 A | | 5/1937 | Williams et al. |
| D236,829 S | | 9/1975 | Berry, Jr. et al. |
| 4,192,750 A | | 3/1980 | Elfes et al. |
| 4,230,571 A | | 10/1980 | Dadd |
| 4,274,970 A | * | 6/1981 | Beitzel ........................ 210/748 |
| 4,595,498 A | * | 6/1986 | Cohen et al. ................ 210/192 |
| 4,615,799 A | * | 10/1986 | Mortensen ................... 210/177 |
| 5,266,215 A | | 11/1993 | Engelhard |
| D353,440 S | | 12/1994 | Ito et al. |
| 5,540,848 A | | 7/1996 | Engelhard |
| D384,128 S | | 9/1997 | Scott |
| 5,709,799 A | | 1/1998 | Engelhard |
| D407,462 S | | 3/1999 | Bishop et al. |
| 6,007,723 A | | 12/1999 | Ikada et al. |
| 6,080,313 A | * | 6/2000 | Kelada ........................ 210/631 |
| 6,120,691 A | * | 9/2000 | Mancil ........................ 210/748 |
| 6,203,697 B1 | | 3/2001 | Ferguson |

FOREIGN PATENT DOCUMENTS

| | | | |
|---|---|---|---|
| DE | 4446669 A1 | * | 6/1996 |
| DE | 29704175 U1 | * | 5/1997 |
| JP | 61-26391 A | * | 11/1986 |

* cited by examiner

Primary Examiner—Frank M. Lawrence
(74) Attorney, Agent, or Firm—Gallagher & Kennedy, P.A.; Thomas D. MacBlain

(57) ABSTRACT

Water may be purified and treated to kill and/or remove various harmful contaminants and microorganisms with a method and system including ozone treatment and oxygenation. In the present system and method, the ozone treatment and oxygenation process is carried out in the chamber of one canister and includes one or two further canisters, either a pre-filtration canister that contains a filter for removing large particulates that might interfere with the ozone treatment and oxygenation process, or a post-filtration canister that contains a filter for removing smaller particulates downstream, or both. The system is versatile in that one or the other of the filtration canisters can be eliminated. To limit the expense of manufacturing the system, the exterior of the canisters are identically molded and the bottom caps of the canisters are integrally molded to the body of the canisters, also eliminating one possible leakage point.

8 Claims, 8 Drawing Sheets

VERSATILE, MODULAR, MULTI-STAGE WATER PURIFICATION SYSTEM

The present patent application claims priority from U.S. Provisional Patent Application Ser. No. 60/273,646 filed Mar. 6, 2001, and U.S. Provisional Patent Application Ser. No. 60/348,087 filed Jan. 11, 2002.

BACKGROUND OF THE INVENTION

1. Field of the Invention

This invention relates to water purification systems and more particularly to multi-stage water purification systems that combine at least a plurality of a pre-filtration stage, ultraviolet light (UV) irradiation, ozone treatment and oxygenation stage, and a post-filtration stage.

2. Discussion of Prior Art

Water purification systems that combine filtration, UV irradiation and ozone treatment and oxygenation are known from U.S. Pat. Nos. 5,266,215, 5,540,848 and 5,709,799. These do not provide modular flexibility that permits adapting the system to particular, local water purification needs. In U.S. Pat. Nos. 5,266,215 and 5,540,848, for example, a single canister is described that combines filtration, the UV irradiation ozone and oxygenation treatment in a single chamber, but locates a filter in the UV, ozone, oxygenation chamber and so lessens the exposure of the water to the UV and ozone. Moreover, the system is not so versatile as to allow the user to adapt the system by choosing just one of pre-filtration, post-filtration or both in combination with UV irradiation and ozone treatment.

Introducing unfiltered water into UV irradiation can be ineffective when suspended particulates render the water so murky as to prevent the penetration of UV radiation. Also filters fine enough to collect bacteria on their surface have presented the problem that such bacteria breed there. A multi-stage purification system employing separately housed stages could be expected to be considerably more expensive than an all-in-one filtering, UV irradiating, ozone treating and oxygenation unit. Accordingly, there is a need for a water purification system and method that permits adaptation to existing conditions by separately housing a pre-filtration station, a UV irradiation and ozone treatment station and a post-filtration station, but that is carefully designed and constructed so as not to unreasonably increase the expense of manufacture.

SUMMARY OF THE INVENTION

In accordance with this invention there is provided a water purification system and method that, in addition to ultraviolet light irradiation, ozone treatment and oxygenation, provides such filtration as is required for the water that is available at a particular location. In this system, one canister defines a chamber for ultraviolet irradiation, ozone treatment and oxygenation and one or more other canisters provide one or more chambers for pre-filtration and/or post-filtration. As used here, "pre-filtration" means filtering of water prior to its introduction to the location where ultraviolet irradiation occurs. "Post-filtration" means filtering the water downstream from such location of ultraviolet irradiation treatment. "Pre-filter" and "post-filter" mean the filters used for pre-filtration and post-filtration, respectively.

Water quality and chemistry can vary dramatically for region to region. The three chamber integrated design of this invention allows use of the best available technologies in unique series to handle a wide range of localized water problems. A customized pre-filter can be installed to handle specific contaminants to be followed by ozonation, UV exposure (and resulting photo-catalytic oxidation) and carbon block filtration.

Individual chambers for, first, pre-filtration, second, ozone/UV oxygenation treatment and, third, post-filtration not only allow greater exposure to UV and ozone in the chamber devoted to that treatment, but permit the use of larger, more effective filters and allow the filtration to be chosen as desired to suit local conditions, or even eliminated if one of the filtration stages is not necessary. Where the available water is murky due to an abundance of particulates, pre-filtration clarifies the water. In the canister where the irradiation occurs ("the irradiation canister"), then, ultraviolet light can effectively treat the water without being blocked by the murkiness such particulates cause. Preferably, pre-filtration occurs in a canister defining a chamber in which a filter is located that eliminates almost all particulates larger than 5 microns in size. The filtering is "non-bypass." This means that every drop of water passing through the pre-filtration station is filtered prior to moving to the irradiation station. At the irradiation station, the entire elongate tubular ultraviolet lamp is exposed to the water moving along its length. The absence of any filter at this location means that the entire length of the lamp that is within the irradiation location contributes to ultraviolet irradiation. Ozone is produced in this location and that ozone is introduced into the water moving through the irradiation chamber.

The order of the technologies employed in accordance with the invention is quite important. In a preferred embodiment, a 5 micron polypropylene sediment filter is in the pre-filter chamber. If UV radiation is to be effective, the treated water must be optically clear to allow the UV radiation to pass through the water. If the water is cloudy, the UV radiation cannot pierce the cell membrane of bacteria and/or virus making it impossible to destroy its DNA and ability to reproduce. With pre-filtration this problem is overcome. As the water passes through the ozone/UV/advanced oxidation chamber, bacteria and virus are destroyed. The ozonated water then passes to the carbon block filter chamber. The filter removes any residual ozone, but not before it has had a chance to oxidize contaminants trapped on the outside layers of the carbon block. Each technology compliments the previous leaving completely sanitized and better tasting water.

The filters used can be common, commercially available filters. Ordinarily they are purchased separately and require installation. The three chamber system combines pre- and post-filtration into one, easy to install, easy to service system. Importantly, pre-filters can be selected to eliminate or substantially reduce specific contaminants prior to the UV irradiation, ozone, oxygenation and carbon block filtration processes. For example, some areas have a high degree of calcium, nitrates, arsenic, or fluoride. Pre-filters can be selected to remove these contaminants and installed in less than one minute.

A subsequent, post-filtration canister defines a chamber in which another finer filter is located. Again, the filtration is "non-bypass." This post-filtration filter may be a carbon block filter that removes particulates down to one micron in size. Because of effective irradiation and ozone treatment prior to post-filtration, bacteria collected on the surface of the post-filtration filter has been effectively killed and will not breed there.

The system may be a two or three canister system, depending on what filtration is required by local conditions.

To limit the expense of the use of multiple canisters, a single molded exterior is used for every canister. This means only a single injection mold needs to be employed for the manufacture of the system. As for the interior, the molded canisters are similar, but the irradiation chamber of the irradiation canister is molded with a mold core that provides openings that are characteristic of this canister. One such opening is for the insertion and securing of the elongate ultraviolet lamp and a quartz cylinder that extend into and along the length of the chamber. Another opening accommodates a check valve leading to a venturi in the water flow path for drawing ozone past the check valve and into the water flow. A third opening accommodates a pressure sensor used to turn on the ultraviolet lamp when water pressure is present, as when a tap supplying the system is opened.

The similarity of the exteriors of the canisters means that they are interchangeably supported in a supporting frame adapted to hold two or more of the canisters.

The system combines five proven technologies into one convenient, easy to install, point-of-use device that produces quality drinking water directly from the tap. The efficient and compact system has been designed to install quickly either under a sink or directly to an existing faucet. The system can be installed to supply a water cooler.

The system of the invention is designed to be sold at competitive prices, but yet to be far superior to common water treatment equipment. This water purification system provides the consumer, in effect, with his or her own bottling plant, capable of producing unlimited quantities of pure water, with no waste or chemical byproducts, for pennies per day.

The system significantly reduces the level of harmful or nuisance contaminants commonly found in water supplies throughout the world. In particular, the system will substantially reduce or eliminate the following:

(1) Bacteria such as *Shigella Dysenteriae, Vibrio Cholerac, E. Coli*, and *Salmonella*. These are causes of serious and immediate illness such as dysentery and diarrhea which can lead to dehydration and are attributed to 24,000 childhood deaths each day.

(2) Viruses such as the Poliovirus, Hepatitis A, and Rotavirus, which can cause even more severe and debilitating illnesses.

(3) Larger parasitic organisms known as cysts, such as *Giardia* and *Cryptosporidium*. These are also causes of severe and persistent diarrhea and dysentery.

(4) Organic contaminants including many common fuels, pesticides and herbicides. These can have significant health ramifications and contribute to poor tasting water.

(5) Soluble and insoluble lead, which is present in water supplies to homes and offices with lead pipes, or copper pipes connected with lead solder.

(6) Chlorine, which contributes to poor taste, in high dosages combines to make carcinogenic trihalomethanes.

(7) Cancer causing trihalomethanes, which is a byproduct of the chlorination process.

The inventive system does not remove minerals that one's body requires such as iron, calcium or magnesium, leaving water with its natural, spring-like flavor. In short, this system removes the harmful contaminants and bad tastes found in water supplies, but leaves in minerals that are important to good health.

Previously, canisters for water purification systems were often manufactured out of an extruded piece of plastic tubing. The extrusion would be cut to length, the exterior shape would be machined on a CNC lathe, and then female threads and o-ring grooves were machined in both the top and bottom of the chamber. Next, the canister had to be flame polished, which has a high rate of rejection for appearance. A silicon o-ring was installed in the bottom of the chamber. An injection molded bottom cap with male threads was threaded and sealed into the canister end. Another silicon o-ring was installed on the top of the chamber and an injection molded top cap with male threads was then threaded into and sealed to the top of the canister. This process was very expensive and time-consuming. Each system according to the present invention uses two canisters or three canisters. This, plus the cost of two or three molded bottom caps and two or three O-rings per canister, makes component costs per assembled unit represent more than 60% of the entire bill of materials for the system. By integrally molding the bottom cap and body this cost was significantly reduced and one possible leakage location was eliminated. The foregoing objects and advantages of the invention may be better understood from the following detailed description of one or more preferred embodiments when considered with the accompanying drawings.

DETAILED DESCRIPTION

Figure 1:
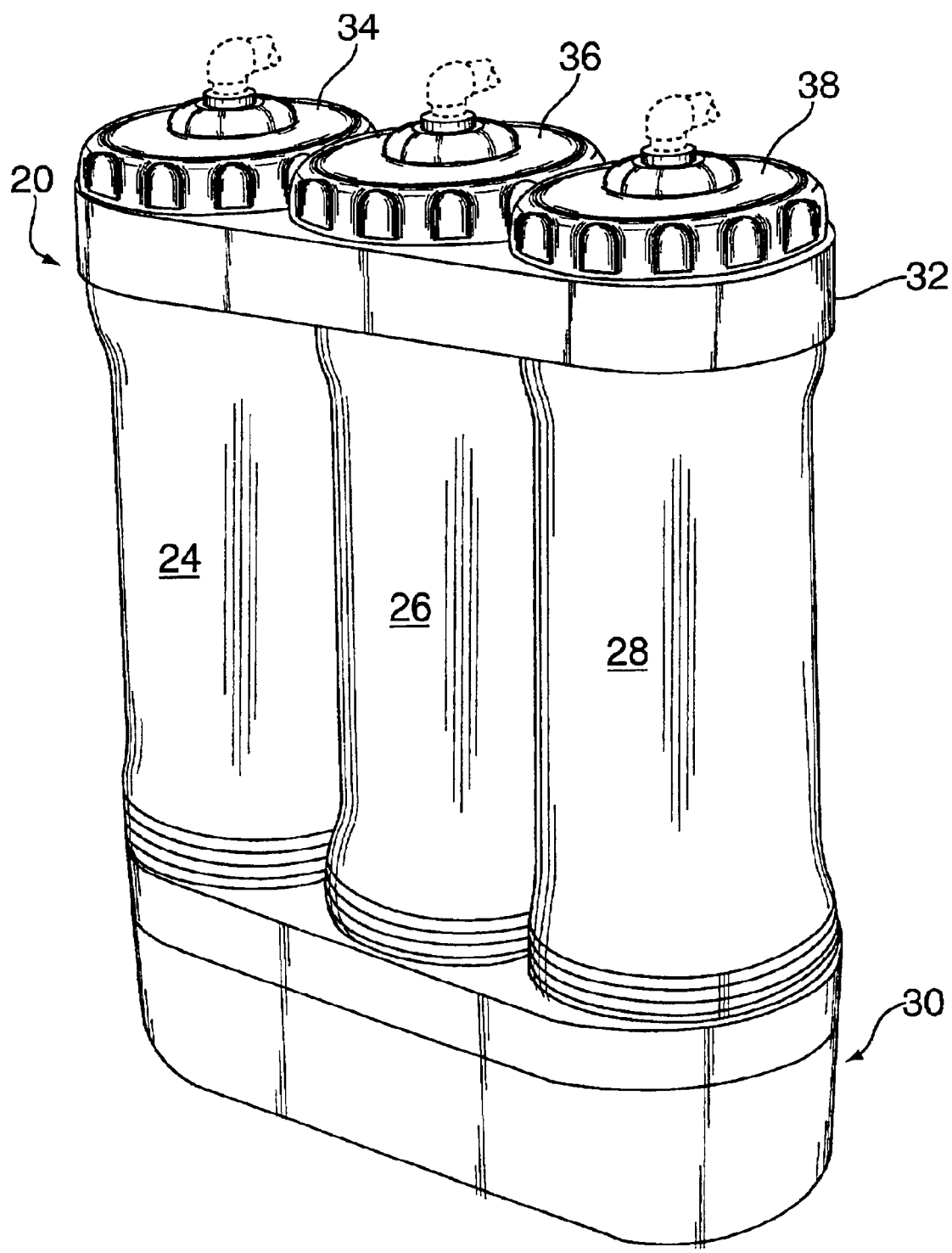
FIG. 1 is a perspective view of a water purification system in accordance with the invention and having two filtration canisters and an irradiation canister.

As shown in FIG. 1, a water purification system 20 according to this invention includes canisters 24, 26, and 28 supported by supporting frame structure 30 and tied together proximate an upper end by a strap 32. Each of the canisters 24, 26 and 28 is closed at its upper end by a cap 34, 36 or 38.

Figure 2:
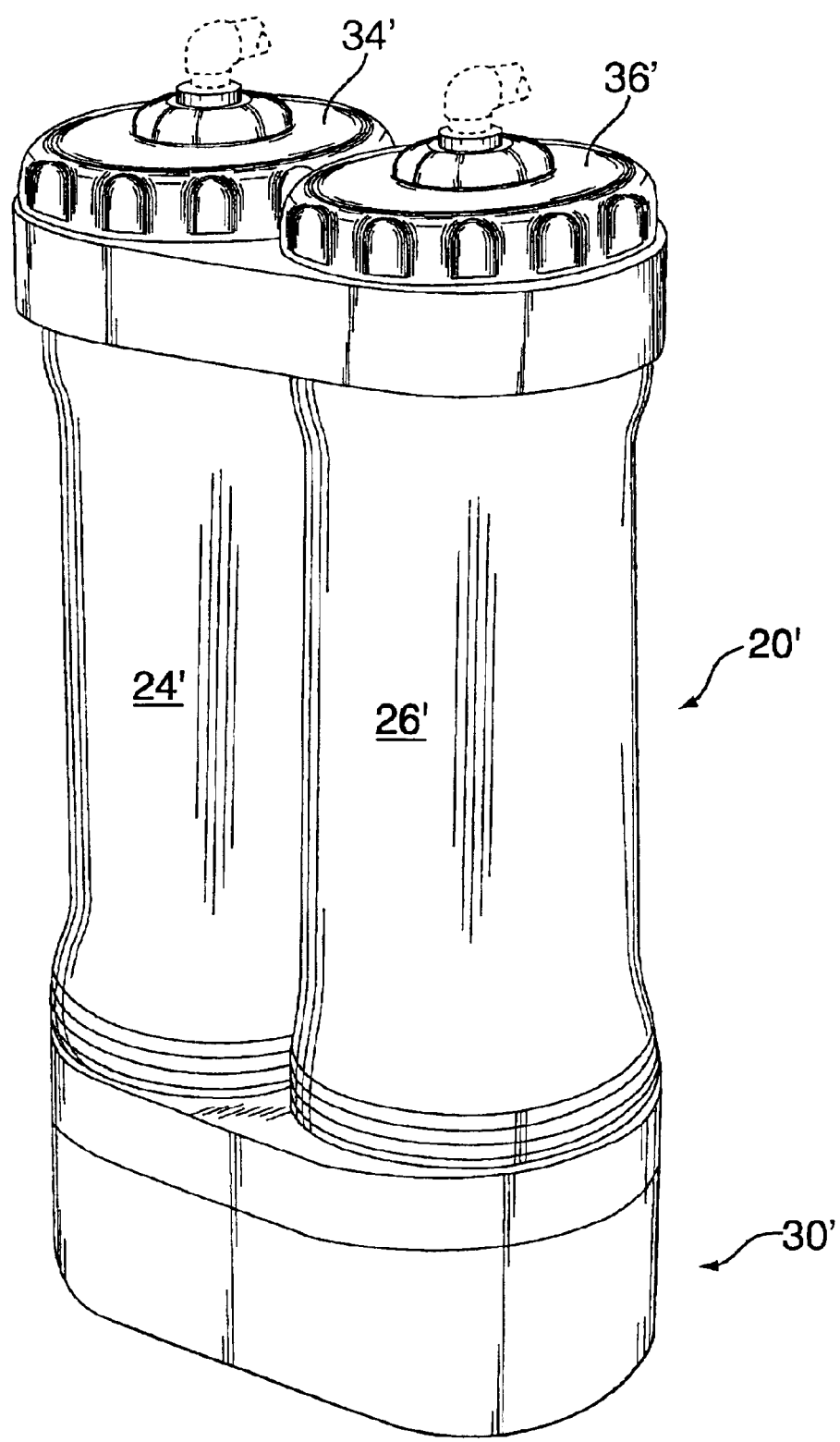
FIG. 2 is a perspective view of a further embodiment of the invention and shows a water purification system with a single filtration canister and the irradiation canister.

In a second embodiment shown in FIG. 2, the purification system of the invention 20' includes just two canisters 24' and 26' supported by supporting frame structure 30'.

Each canister is closed at its upper end by one of the caps 34' or 36'.

Figure 3:
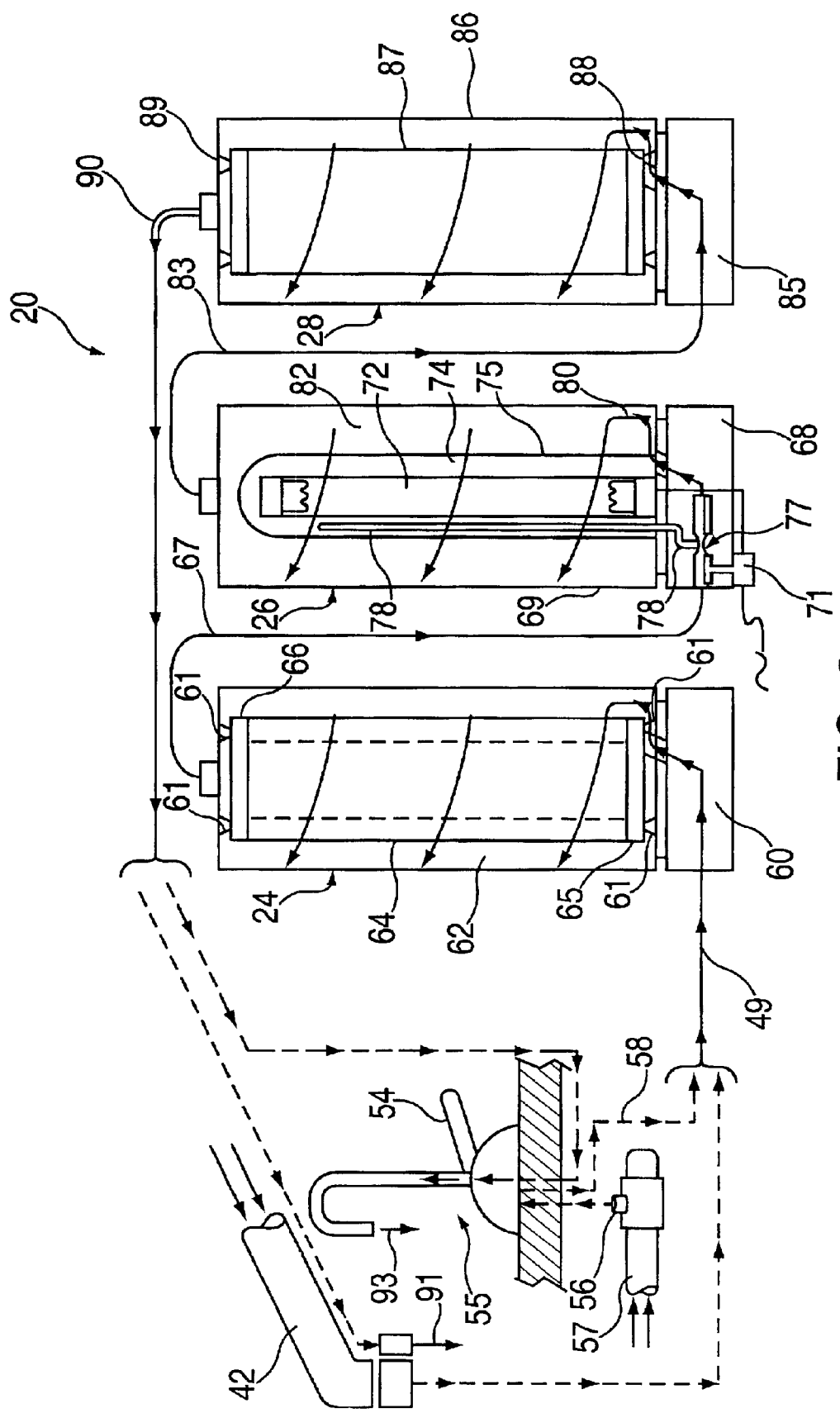
FIG. 3 is a diagrammatic illustration of a three canister unit as illustrated in FIG. 1.

Taking as exemplary the three-canister system of FIG. 1, FIG. 3 illustrates the internal workings of the system. The system 20 is activated only when the water source is turned on. In an above-counter installation, this is achieved by turning on a faucet 42 (this may typically entail pulling a pin on a diverter valve to direct water under pressure to the system 20 at 49). Alternatively, in an under-counter installation, a handle 54 of a known, dedicated faucet 55 is lifted. This connects water under pressure from a bleed 56 on a supply line 57 with a line 58 connecting to the system 20 at its input 49. Untreated water at 49 is directed into the bottom 60 of the pre-filtration chamber 62. As the water flows up and through and around an initial 10" filter 64 (the "prefilter"), 99%+of particles larger than 5 microns are removed to clarify the water upstream of an ozone/UV advanced oxidation process. The pre-filtration filter 64 is a hollow cylindrical filter. It is sealed at both ends 65 and 66 to the chamber 62 so that all water must pass through the filter from the outside of the filter where the water is introduced to the inside of the filter from which the water is withdrawn. The seal at the filter ends 65 and 66 may be a knife edge seal 61 integrally molded on the interior of the canister bottom and cap or to separately insertable disks that seat in the chamber. A knife edge seal is shown in the U.S. Pat. No. 5,266,215 of Engelhard, incorporated by reference. The knife edge seals may engage gaskets on the filters to assure a water-tight seal.

As the filtered water 67 moves to the bottom 68 of the second chamber 69, water pressure activates a pressure switch 71, which automatically switches on a UV/$O_3$ lamp 72. UV irradiation of air in a space 74 between the lamp 72 and a quartz sleeve 75 generates and traps ozone there. The incoming water passes through a venturi 77. Ozone is drawn to the venturi through a stainless steel tube 78. There it is thoroughly mixed into the stream of filtered water.

As the mixture of ozone and water 80 leaves the venturi 77, it is instantly exposed ill 20 to high intensity ultraviolet light from the lamp 72 as it swirls through a space 82. This is where this system's ozone/UV/advanced oxidation process takes place. Once this instantaneous reaction occurs, approximately 70% of the ozone ($O_3$) is converted back to oxygen ($O_2$).

Purified water 83, with some residual ozone moves to the bottom 85 of a post-filter chamber 86. A carbon block filter 87 is sealed on the bottom and top of the cartridge as shown at 88 and 89. Again the seal may be a knife edge seal as referred to above. Like the filter 64 in the first chamber 62, this is known as a "non-bypass filter design." The non-bypass design insures that every drop of water must flow through the filter 87 before leaving the unit the filter removes 99.9%+of particles larger than 1–2 microns.

As water is forced through the extruded carbon block filter 87, dead bacteria, heavy metals, cysts and chlorine are removed. In addition, residual ozone is converted back to oxygen eliminating any strange ozone taste and odor from the water. Water exiting the system at 90 is returned either to the above-counter faucet 42 to be used at 91, or to the faucet 55 for use at 93 in the case of the under-counter installation.

To summarize, the five proven technologies of the system are afforded by three distinct processes that occur in three distinct locations.

First, in chamber 62, the untreated water is pre-filtered to remove particulates and sediment to clarify the water previous to the ozone/UV/advanced oxidation process. The water swirls in and around the pre-filter 64 before leaving the chamber. The main purpose of the pre-filter chamber is to remove sediment and particles from local water supplied to allow the ozone/UV/advanced oxidation chamber to work at maximum efficiency. It will also insure that the venturi located in the ozone (UV chamber does not plug, which is essential to the proper operation of the system. The cartridge used in this chamber can be adapted to fit local water conditions. For example, in areas where hard water conditions exist, a pre-filter can be used that also incorporates de-ionization media.

The second chamber 69 is dedicated to the ozone/UV/ advanced oxidation process. Ozone rich water is exposed to high intensity UV light for a prolonged period of time (approximately 20 seconds). The reaction of $O_3$ and UV is at least 50 times more powerful than using either ozone or UV light by themselves. This powerful reaction destroys a much wider range of bacteria and viruses than conventional UV systems. In addition, ozone helps to remove chlorine and its harmful byproducts, such as trihalomethanes, substantially improving the taste and odor of water with no chemical additives or residuals. Ozone residual also inhibits bacteriological growth on the outside of the carbon filter 87 in the following stage.

Lastly, the system's non-bypass filter design ensures that before leaving the unit every drop of water is forced through the extruded carbon block filter 87 in chamber 86. Extruded carbon block does not allow channeling or bypass, a common trait among granular activated carbon filters. Again, the water swirls around and through the filter. It is introduced outside the filter and withdrawn from inside the filter. The filter removes the bacteria and virus destroyed during the $O_3$/UV process, further improving the taste, odor, and drinkability of the water. It also substantially reduces total organic carbon, lead (both soluble and insoluble), chlorine and trihalomethanes. The extruded carbon block post-filter exceeds the National Sanitation Foundation's standards for turbidity and reduction of such cysts as *Giardia lamblia* and *Cryptosporidium*.

The absence of any filter in the ozone/UV/advanced oxidation chamber 69 increases the exposure time of the incoming water to ozone and UV radiation by 30% over earlier units that combined a filter with UV radiation and ozone exposure, resulting in better performance than these earlier units. This improvement has eliminated several components that made assembly, service and maintenance of the earlier unit slower and more difficult. The elimination of the filter from within this chamber makes the visual presentation of the system even more impressive since the entire chamber interior can be seen if a transparent canister is used.

The 2 micron carbon post-filter 87 has been increased in size by three times over the earlier unit referred to above and is now located in its own chamber 86. This greatly extends the life of the filter and reduces consumer maintenance. The original post filter was rated for 500 gallons or six months of use; the new filter is rated for 2,500 gallons which ordinarily translates into a minimum of two years' usage.

Figure 4:
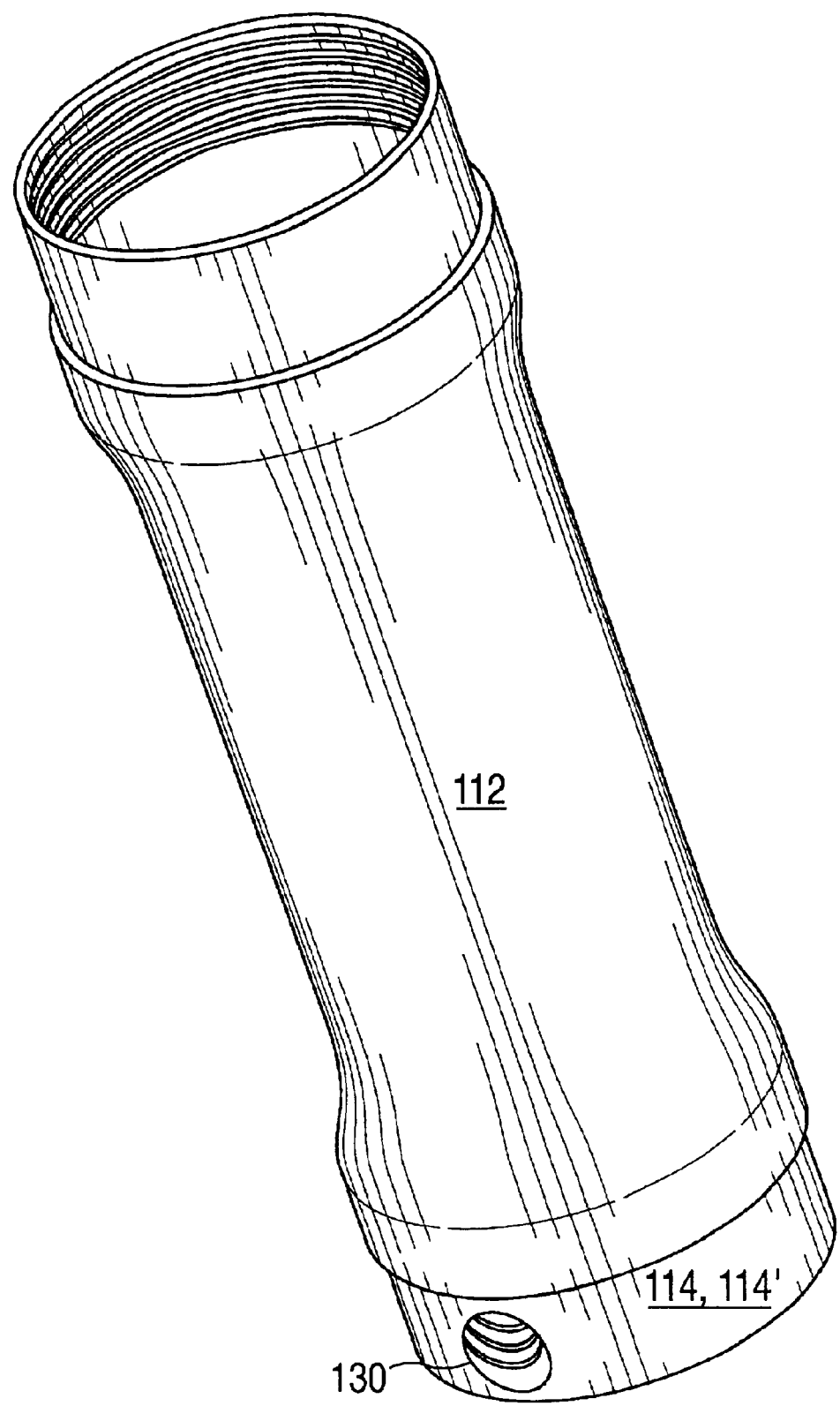
FIG. 4 is a perspective view of the exterior of an injection molded canister body and bottom for use in the system of the invention.
Figure 5:
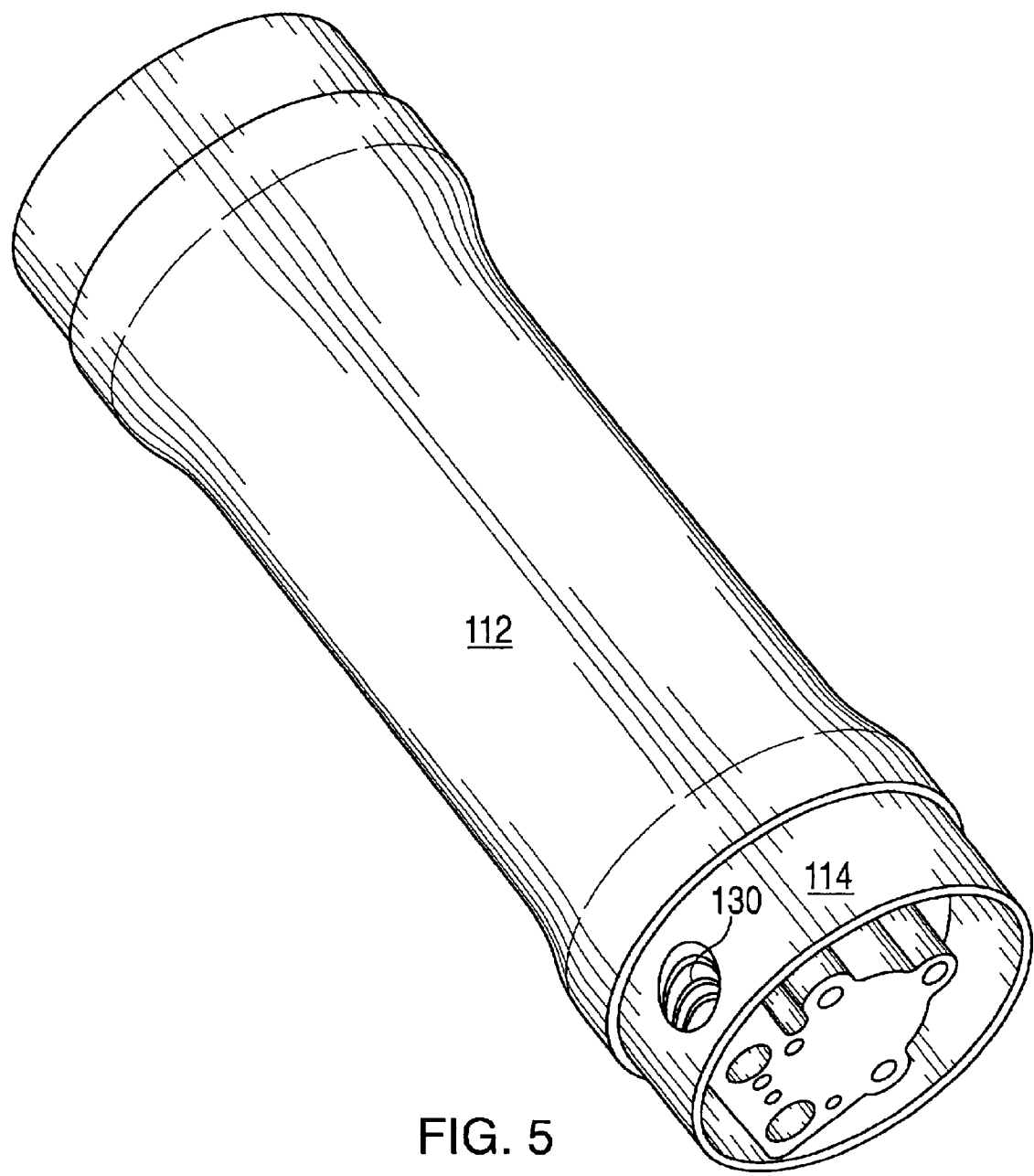
FIG. 5 is a further perspective view of the canister body and bottom of FIG. 4.
Figure 6:
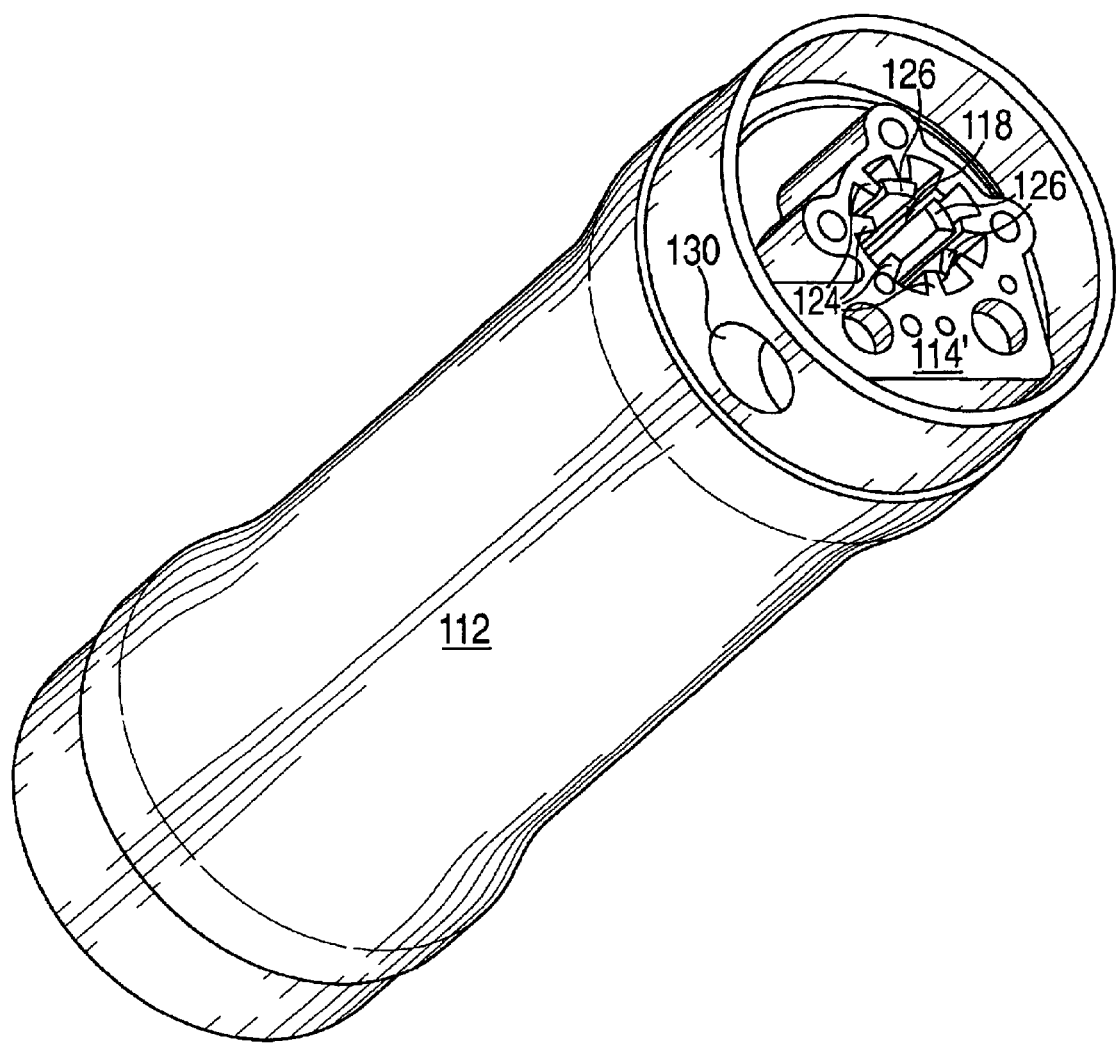
FIG. 6 is a further perspective view of a canister body and bottom adapted for use as an irradiation canister.

The new canisters 24, 26, and 28 or 24', 26' of this invention combine the chamber sidewall 112 shown in FIGS. 4, 5 and 6 and bottom cap 114 or 114' into one piece. This allows elimination of the separate bottom caps and O-rings (2–3 each per assembled unit) of earlier units. It also eliminates one potential leak point. The molded part comes out optically clear every time, eliminating the need for polishing. Assembly and inspection time and potential quality problems have been reduced, further lowering costs. Reject rate drops dramatically. A molded reject can, moreover, be recycled. A machined reject can only be thrown away at a cost per part. Each new molded chamber will not only cost less but will become lower in cost with volume.

Figure 7:
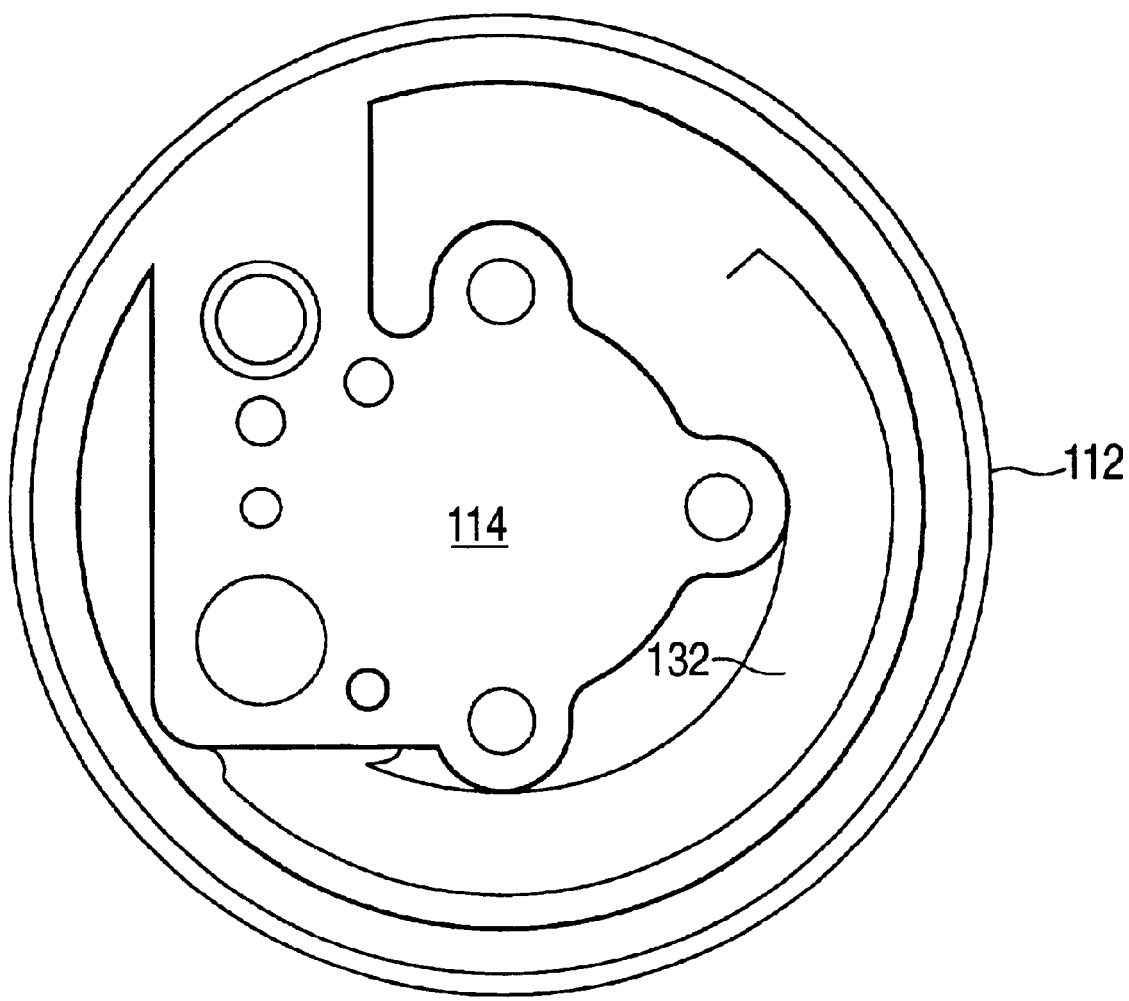
FIG. 7 is the bottom plan view of the canister body and bottom of FIGS. 4 and 5.
Figure 8:
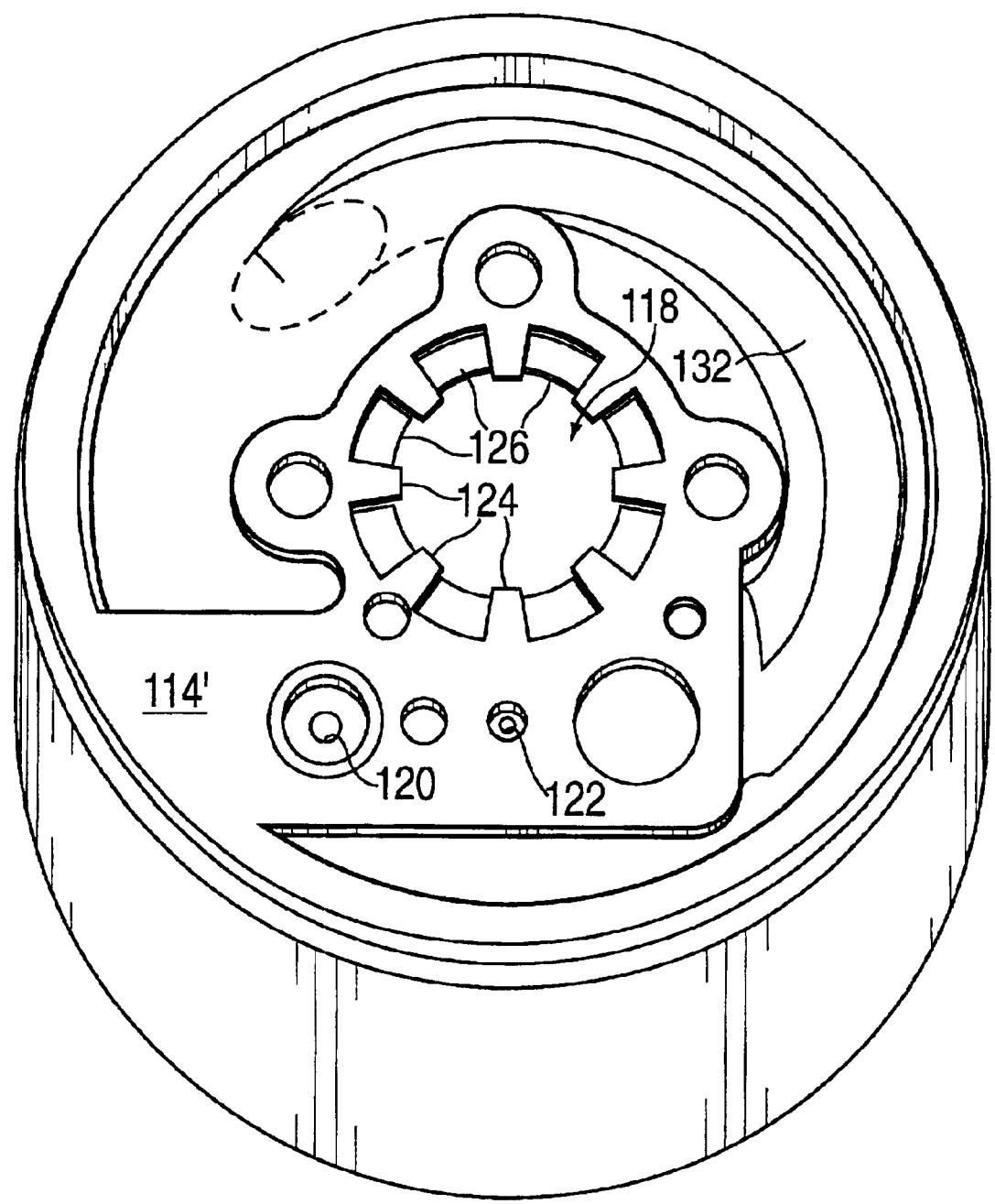
FIG. 8 is a bottom plan view of the body and bottom of FIG. 6.

The configuration of chamber differs between the chambers used for filtration, and the UV chamber. Shown in FIG. 7, the bottom portion of the molded chambers for filtration simply need to be water-tight. As seen in FIG. 8, the irradiation chamber on the other hand, has a through hole 118 on its end cap 114' and other ports 120, 122 for installation of components. With the changing of core pins (for forming the holes 118, 120 and 122), the same mold will make both parts, eliminating the need for costly and time-consuming secondary operations. It also eliminates the need to build a separate mold at a cost of many thousands of dollars. Seats for O-rings can be molded in the canister bottom to engage the quartz tube and in the separable upper cap to seal the connection to the canister body. The through hole 118 is equipped with two sets of radially projecting, axially offset legs 124, 126 for locking the base of a UV lamp into place.

Because the new part eliminates a potential leak point in the system, liability and warranty service is reduced. Like prior art separable end caps, the integral end of this invention defines a water inlet at 130 (FIGS. 2, 3 and 4, 5 and 6) that communicates to a swirl producing channel, the outside of which is seen best at 132 in FIGS. 7 and 8. Also because the canister bottoms are all alike in their outer configuration they can be seated readily on the two or three canister, supporting frame in the desired sequence, without thought to whether the canister and its seat on the frame will correctly interfit.

While one or more specific preferred embodiments of the invention have been described, it will be appreciated that numerous variations and modifications can be made as will be apparent to those skilled in the art and without departure from the spirit and scope of the invention as set forth in the appended claims.

I claim:

1. A versatile modular water purification system including:
   a) a frame structure for joining and supporting, in side-by-side relation, a plurality of chamber-defining canisters serially in a path of water flow through the system,
   b) an irradiation canister supported on the frame structure, said irridiation canister defining an irridiation chamber having an ultraviolet light (UV), ozone treatment and oxygenation location extending along its length,
   c) at least one of a pre-filtration and post-filtration filtering canister supported on the frame structure at least one of an upstream and a downstream location with respect to the irradiation canister, said filtering canister defining a chamber and having a filter location therein for location a filter in sealed, non-bypass filtering relation to the flow of water therethrough,
   d) wherein each of said canisters has a substantially identically molded exterior, each interfitting with the frame structure in like manner.

2. A versatile modular water purification system including:
   a) a frame structure for joining and supporting, in side-by-side relation, a plurality of chamber-defining canisters serially in a path of water flow through the system,
   b) an irridiation canister supported on the frame structure, said irridiation canister defining an irradiation chamber having an ultraviolet light (UV), ozone treatment and oxygenation location extending along its length,
   c) at least one of a pre-filtration and post-filtration filtering canister supported on the frame structure located at least one upstream and a downstream location with respect to the irradiation canister, said filtering canister defining a chamber and having a filter location therein for locating a filter in sealed, non-bypass filtering relation to the flow of water therethrough,
   d) wherein the at least one of a pre-filtration and post-filtration filtering canister includes a pre-filtration filtering canister at an upstream location with respect to the irradiation canister, the pre-filtration canister having a pre-filtration filter effective to clarify water moving to the irradiation chamber to thereby substantially eliminate UV irradiation blockage by particulates in the water to be irradiated, and
   e) wherein the at least one of a pre-filtration and post-filtration filtering canister includes a post-filtration filtering canister supported downstream of the irradiation canister on the frame structure and having a chamber housing, in sealed, non-bypass filtering relation to the flow of water therethrough, a filter finer than the pre-filtration filter.

3. The versatile modular water purification system according to claim 2, wherein the irradiation chamber is an elongate chamber housing an elongate UV lamp extending from one end of the irradiation chamber to another end of the irradiation chamber along the length of the chamber, the UV lamp being exposed along the entirety of its length within the irradiation chamber to irradiate all of the water moving through the irradiation chamber at any given time from an inlet at one end of the irradiation chamber to an outlet at another end of the irradiation chamber.

4. A versatile modular water purification system including
   a) a frame structure for joining and supporting, in side-by-side relation, a plurality of chamber-defining canisters serially in a path of water flow through the system,
   b) an irradiation canister supported on the frame structure, said irradiation canister defining an irradiation chamber having an ultraviolet light (UV), ozone treatment and oxygenation location extending along its length,
   c) at least one of a pre-filtration and post-filtration filtering canister supported on the frame structure located at least one of an upstream and a downstream location with respect to the irradiation canister defining a chamber and having a filter location therein for location therein for locating a filter in sealed, non-bypass filtering relation to the flow of water therethrough,
   d) wherein each of said canisters has a substantially identically molded exterior, each interfitting with the frame structure in like manner,
   e) wherein each canister has an elongated cylindrical wall integrally molded to an end cap, the end cap defining a water input port communicating with a swirl producing channel, the port and the channel being integrally molded into the end cap.

5. The versatile modular water purification system according to claim 4, wherein the end cap has a generally centrally located bore leading into the interior of the chamber, said bore having integrally molded generally radially extending lugs for securing a UV lamp in place within the chamber.

6. A water purification system having a plurality of chambers connected serially in a path of water flow through the system, including:
   (a) an irradiation chamber having an ultraviolet light (UV), ozone treatment and oxygenation location extending along its length and free of filters, and at least one filter chamber, the UV, ozone and oxygenation treatment location comprising an elongate UV lamp extending alone the length of the irradiation chamber to irradiate water moving in the chamber from a water inlet at one end of the irradiation chamber to a water outlet at a further end of the irradiation chamber, (b) the at least one filter chamber having a water inlet at one end, a water outlet at another end and a filter location intermediate the water inlet and the water outlet in the path of water flow for locating a filter in non-bypass relation to the flow of water from the water inlet to the water outlet, (c) wherein the at least one filter chamber is a chamber that is upstream of the irradiation chamber, a water connection from the water outlet of the at least one filter chamber to the water inlet of the irradiation chamber, and the system including at least one further filter chamber downstream of the irradiation chamber, the at least one further filter chamber having a water inlet at one end and a water outlet at the other end, a water connection from the water outlet of the irradiation chamber to the water inlet of the at least one further filter chamber and a further filter location intermediate the water inlet and the water outlet of the at least one further chamber, (d) wherein the upstream chamber contains a pre-filtration filter effective to clarify water moving to the irradiation chamber to thereby substantially eliminate UV irradiation blockade by particulates in the water to be irradiated, and the at least one further filter chamber contains a post-filtration filter finer than the pre-filtration filter, (e) wherein the post-filtration filter is a carbon block filter adapted to remove over 90% of particulates larger than about one micron to filter out materials of the group consisting of dead bacteria heavy metals, cysts, viruses, chlorine, lead, carbon, heavy metals and trihalomethanes, (f) wherein ozone treatment in the irradiation chamber is effective to substantially reduce or eliminate live bacteria in the flow of water to the carbon block filter to substantially reduce or eliminate breeding of bacteria at the carbon filter.

7. A water purification system having a plurality of chambers connected serially in a path of water flow through the system, including:

(a) an irradiation chamber having an ultraviolet light (UV), ozone treatment and oxygenation location extending along its length and free of filters, and at least one filter chamber, the UV, ozone and oxygenation treatment location comprising an elongate UV lamp extending along the length of the irradiation chamber to irradiate water moving in the chamber from a water inlet at one end of the irradiation chamber to a water outlet at a further end of the irradiation chamber, (b) the at least one filter chamber having a water inlet at one end, a water outlet at another end and a filter location intermediate the water inlet and the water outlet in the path of water flow for locating a filter in non-bypass relation to the flow of water from the water inlet to the water outlet, (c) wherein both the irradiation chamber and the at least one filter chamber are formed in canisters having side walls and one end integrally molded, a closure at a further end detachably secured to the side walls, each end of the at least one filter chamber canister having a knife edge seal engaging an end of a contained cylindrical filter extending along the length of the chamber, each of the water inlet and water outlet of the at least one filter chamber opening to one of an exterior and an interior of the cylindrical filter so that water flows through the filter from the inlet to the outlet.

8. A method of water purification comprising:

(a) directing a flow of water through a plurality of serially connected chambers, (b) providing a first, filtration chamber, (c) locating a first filter in the first chamber in non-bypass relation to the flow of water therethrough, to provide filtration in the first chamber of all of the water flowing through the chamber, (d) providing a second, irradiation chamber, (e) directing the flow of water from the first chamber through the second chamber, (f) irradiating the flow of water through the second chamber with ultraviolet light (UV), (g) venerating ozone in the second chamber, (h) introducing the ozone generated in the second chamber into the flow of water through the second chamber, (i) clarifying the water flowing through the first chamber by removing articulates in the first chamber to substantially prevent particulates interfering with UV irradiation of water flow through the second chamber, (j) wherein the step of locating a first filter in the first chamber includes locating a generally hollow cylindrical filter, with an interior and an exterior, lengthwise in the first chamber and sealing the filter at its ends at the top and bottom of the chamber to prevent water flow between the exterior and the interior of the filter other than through the filter, and the step of directing a flow of water through the plurality of serially connected chambers includes directing the flow of water into the first chamber to one of the exterior and interior of the hollow cylindrical filter therein and directing the flow of water out of the second chamber from the other of the exterior and interior of the hollow cylindrical filter therein, (k) wherein the step of irradiating comprises locating an elongate lamp in the second chamber extending from one end of the second chamber to the other end of the second chamber and directing ultraviolet light from the lamp to the flow of water through the chamber along the entire length of the lamp within the chamber, (l) providing a further filtration chamber in the path of water flow downstream of the second chamber, including locating within the further filtration chamber, in the path of water flow therethrough, a finer filter than that located in the first filter, (m) wherein locating within the further filtration chamber a finer filter includes locating a generally hollow cylindrical filter, with an interior and an exterior, lengthwise in the further chamber and sealing the filter at its ends at the top and bottom of the chamber to prevent water flow between the exterior and the interior of the filter other than through the filter, and the step of directing a flow of water through the plurality of serially connected chambers includes directing the flow of water into the first chamber to one of the exterior and interior of the hollow cylindrical filter therein and directing the flow of water out of the chamber from the other of the exterior and interior of the hollow cylindrical filter therein.

* * * * *